(No Model.)
T. A. EDISON.
DUST PROOF JOURNAL BEARING.
No. 472,752. Patented Apr. 12, 1892.
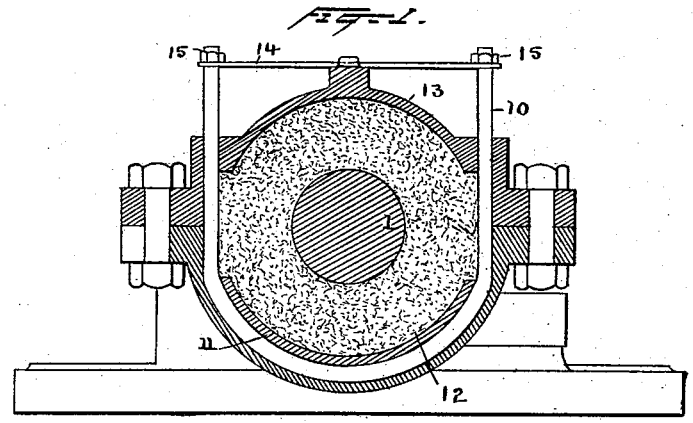
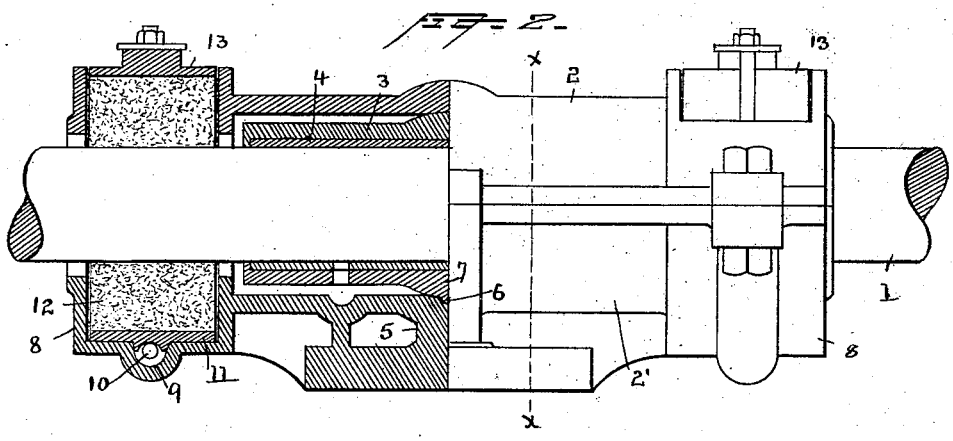
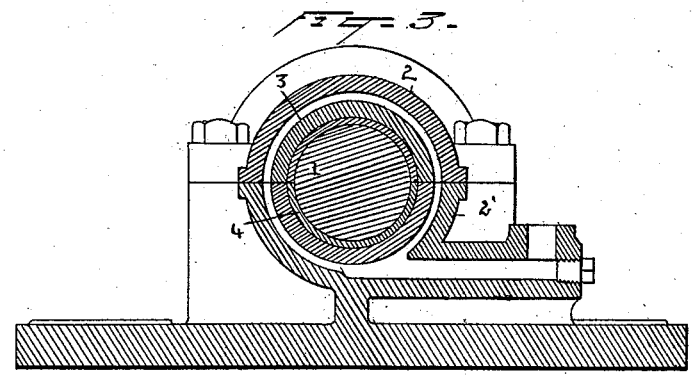
Witnesses  
Norris A Clark  
Inventor  
T. A. Edison  
By his Attorneys  
Dyer & Seely

UNITED STATES PATENT OFFICE.

THOMAS A. EDISON, OF LLEWELLYN PARK, NEW JERSEY.

DUST-PROOF JOURNAL-BEARING.

SPECIFICATION forming part of Letters Patent No. 472,752, dated April 12, 1892.

Application filed October 1, 1891. Serial No. 407,457. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Dust-Proof Journal-Bearings, (Case No. 936,) of which the following is a specification.

The present invention relates to bearings for shafts, especially to bearings designed for use in machinery for crushing or otherwise treating ore; and the main object is to provide means for excluding dust from the bearings, and thereby protecting them from undue friction and wear.

In the drawings, Figure 1 is a cross-sectional view of a shaft and its dust-excluding joint. Fig. 2 is a side view, partly in section, of the same; and Fig. 3 is a cross-section on line $x$ $x$ of Fig. 2.

1 is a shaft, and 2 2' is a bearing-box, made in two sections for the bearing 3, which consists of a suitable casting and a layer of Babbitt metal 4, arranged in any suitable or convenient manner. The box 2 2', which loosely incloses and supports the bearing, is provided at the center with a support 5, having a groove or depression 6, in which the corresponding rib 7 of the bearing rests. This is for the purpose of allowing a slight movement or play of the bearing in its seat.

At each end of the box 2 2' and integral therewith is a holder or receptacle 8. The holder is cast with a groove 9, into which is placed a U-shaped rod or staple 10, and over this is placed a curved plate or block 11. A filling 12, of cotton or other fibrous material, is then put into the holder so that it entirely surrounds the shaft. The open top of the holder is then covered by a curved plate 13. A cross-arm 14 is slipped onto the ends of the U-shaped rod and rests on the top of the cover, and the cover is forced down and at the same time the plate 11 is raised by turning the nuts 15. In this manner the fibrous material is compressed with substantial equality on all sides of the shaft, and so surrounds and protects the same that no dust can get into the bearing to wear and destroy it. The fibrous material is readily accessible, so that it can be removed and be replaced by new material with very little trouble and without the necessity of stopping the shaft. Since the openings in the holders through which the shaft passes are slightly larger than the shaft, the shaft can move independently of the holders and the joint will nevertheless be maintained perfect.

It will be evident that the bearing might be so located that the dust-proof attachment would be necessary only at one end, and this I consider within my invention, and I do not confine myself to the exact means described for compressing the material around the shaft.

In applications Serial No. 407,458, dated October 1, 1891, and Serial No. 408,115, dated October 8, 1891, are described other species of dust-proof bearings bearing certain resemblance to the bearing described in this specification. Those forms are not claimed herein.

What I claim is—

1. The combination of a shaft, a shaft-bearing, a box or casing loosely inclosing and supporting the same, said box or casing having at an end thereof a holder forming a part of the box or casing, packing material in the holder, and means for securing and compressing it, substantially as described.

2. The combination of a shaft, a shaft-bearing, a box or casing loosely inclosing and supporting the same, said box or casing having at each end thereof a holder forming a part of the box or casing and closed at the bottom, but open at the top, packing material in the holder, and means for securing and compressing it, substantially as described.

This specification signed and witnessed this 28th day of August, 1891.

THOS. A. EDISON.

Witnesses:
CHARLES M. CATLIN,
JOHN F. RANDOLPH.